(12) United States Patent
Ido et al.

(10) Patent No.: US 6,326,103 B1
(45) Date of Patent: Dec. 4, 2001

(54) SEALED STORAGE BATTERY AND MODULAR SYSTEM THEREFOR

(75) Inventors: Isao Ido, Kosai; Takashi Nakajima, Toyohashi, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/274,834

(22) Filed: Mar. 23, 1999

(30) Foreign Application Priority Data

Mar. 25, 1998 (JP) .................................................. 10-077081
Nov. 9, 1998 (JP) .................................................. 10-318080

(51) Int. Cl.[7] ............................ H01M 6/42; H01M 2/10; H01M 2/00; H01M 2/04
(52) U.S. Cl. ............................ 429/156; 429/99; 429/148; 429/176
(58) Field of Search .............................. 429/99, 148, 176, 429/156

(56) References Cited

U.S. PATENT DOCUMENTS

| | | |
|---|---|---|
| 5,304,434 | 4/1994 | Stone . |
| 5,403,679 * | 4/1995 | Stone ...................................... 429/99 |
| 5,695,891 | 12/1997 | Misra et al. . |
| 5,780,180 * | 7/1998 | Okamoto .............................. 429/175 |
| 5,800,942 * | 9/1998 | Hamada .............................. 429/148 |

FOREIGN PATENT DOCUMENTS

| | | |
|---|---|---|
| 0 576 138 A1 | 12/1993 | (EP) . |
| 0 771 037 A1 | 5/1997 | (EP) . |
| 905 222 | 9/1962 | (GB) . |
| 06-054192 | 7/1994 | (JP) . |

* cited by examiner

Primary Examiner—Stephen Kalafut
Assistant Examiner—Julian A. Mercado
(74) Attorney, Agent, or Firm—Akin, Gump, Strauss, Hauer & Feld, L.L.P.

(57) ABSTRACT

The present invention provides a modular system for accommodating batteries therein, which has a simple structure and a high reliability and prevents a difference in properties between the batteries included therein. The modular system includes a plurality of single batteries 1, which are arranged side by side between the beams of a top plate 21 and a bottom plate 22 to locate covers of the batteries 1 with terminals on a front side of the top plate 21 and the bottom plate 22. The single battery 1 has a plurality of ribs 12 that are formed on a specific pair of opposite outer surfaces in such a manner as to extend in a longitudinal direction of the single battery 1, and have concaves formed at regular intervals. The plurality of ribs 12 formed on each outer surface of each single battery 1 are in contact and joined with the plurality of ribs 12 formed on a matching outer surface of an adjoining single battery 1. The joint surfaces of the adjacent single batteries 1 form connection grooves 13 that are defined by the concaves of the ribs 12 and extend perpendicularly to the top plate 21 and the bottom plate 22.

20 Claims, 16 Drawing Sheets

SEALED STORAGE BATTERY AND MODULAR SYSTEM THEREFOR

BACKGROUND OF THE INVENTION

The present invention relates to a sealed storage battery, especially a sealed storage battery that includes a large number of cells and is used as a high-voltage, large-capacity emergency power source, as well as to a modular-type battery system assembly for accommodating the sealed storage battery therein.

High-voltage, large-capacity storage batteries are used for the back-up power source of, for example, the telephone switchboard and the computer, and the power source for emergency lighting. With a view to simplifying the maintenance, the use of sealed lead-acid storage batteries that take advantage of the oxygen cycle, in which gaseous oxygen evolved in the course of charging is absorbed by the negative electrode, has been increasing for such applications. A number of the large-capacity storage batteries, however, have a large total weight, which results in increasing the required parts of a battery system for accommodating the batteries therein, complicating its structure, and thereby raising the manufacturing cost of the battery system.

The battery evolves heat in use. In the case where a plurality of batteries are used in the form of a battery assembly, the heat remains and hardly diffuses on the central portion. The battery located near the center is accordingly worked at a higher temperature than the batteries located outside. Namely there is a difference in working environmental temperature between the batteries located inside and outside. The temperature difference results in a difference in properties between the batteries. Such difference is accumulated when the batteries are used over a long time period. This adversely affects the reliability of the power source system. The temperature difference is further increased when a plurality of the battery assemblies are laid one upon another to constitute a high-voltage battery system assembly.

In order to dissipate the heat evolved in the battery and eliminate the adverse effect of the temperature difference, one proposed structure has ribs extending in the longitudinal direction on the outer surface of the battery container to define spaces between the battery container of the adjoining battery (for example, Japanese Laid-Open Utility Model Publication No. Hei 6-54192). When the plurality of batteries are arranged in the sidelong orientation, the spaces defined by the ribs of the adjoining batteries are made parallel to the outer surfaces of the battery containers. In this case, the heat evolved in the battery assembly can not be dissipated upward by the air current.

In one proposed modular system for accommodating batteries to solve the above problem, a plurality of batteries are laid one upon another in such a manner that terminals are located on the left and right sides of the modular system and each battery is inserted in a space defined by a top plate, supporting columns, and a bottom plate (Japanese Laid-Open Patent Publication No. Hei 6-89706). Since the batteries are laid one upon another, there is no empty space between the adjoining upper and lower batteries. This arrangement does not allow the heat evolved in use, especially in the course of charging, to be dissipated. When the batteries are used over a long time period, a significant difference tends to occur between the properties of the batteries included in the modular system. The power source system is generally charged with a constant voltage. A gradual increase in temperature of the battery accordingly lowers the charging voltage of the battery. This may cause release of the heat that increases the charging current and thereby result in fatal failures.

BRIEF SUMMARY OF THE INVENTION

One object of the present invention is thus to provide a sealed storage battery having a structure that enables heat evolved in a battery assembly, where a plurality of single batteries may be arranged side by side either in an upright orientation or in an sidelong orientation, to dissipate upward through the air current.

Another object of the present invention is to provide a modular system for accommodating batteries, which has a simple structure that ensures dissipation of heat in connection with the shape of the batteries and improves the reliability of the batteries.

Still another object of the present invention is to provide a large-size modular-type battery system assembly that include a plurality of the above modular systems.

At least part of the above and the other related objects is attained by a sealed storage battery including: a stack of electrode plates, in which positive electrode plates and negative electrode plates are alternately laid -one upon another via separators; a battery container that has an upper opening and receives the stack of electrode plates and an electrolyte therein; and a cover that has a positive electrode terminal, a negative electrode terminal, and a safety valve and seals the upper opening of the battery container, wherein the battery container has a plurality of first ribs that are formed on a specific pair of opposite outer surfaces of the battery container in such a manner as to extend in a longitudinal direction, be arranged via a predetermined first space, and have concaves formed at regular intervals.

The present invention is also directed to a first modular system for accommodating batteries. The first modular system includes: a top plate and a bottom plate that respectively have a plurality of beams spanned and fixed over a longitudinal axis thereof; left and right side plates that respectively join left ends and right ends of the top plate and the bottom plate; a supporting column arranged at least on a rear side of the top plate and the bottom plate; and a plurality of single batteries arranged side by side between the top plate and the bottom plate to locate covers of the batteries with terminals on a front side of the top plate and the bottom plate. Each of the single batteries has a plurality of ribs that are formed on a specific pair of opposite outer surfaces in such a manner as to extend in a longitudinal direction of the single battery, that is, from the front side to the rear side of the top plate and the bottom plate, and have concaves formed at regular intervals. The plurality of ribs formed on each outer surface of each single battery are in contact and joined with the plurality of ribs formed on a matching outer surface of an adjoining single battery. The joint surfaces of the adjacent single batteries form connection grooves that are defined by the concaves of the ribs and extend perpendicularly to the top plate and the bottom plate.

In the first modular system, it is preferable that both the top plate and the bottom plate have the beams fixed on an inner surface thereof and a large number of openings to ensure the air current.

It is also preferable that both the top plate and the bottom plate have a suspended piece that is obtained by bending the rear side of each plate inward to be in contact with the beam located on the rear side, and the suspended piece is brought into contact with a bottom of each single battery to position the battery in the longitudinal direction.

In accordance with another preferable application of the first modular system, both the top plate and the bottom plate have a projected end piece that is obtained by bending the front side of each plate inward, and the projected end pieces have apertures that receive fixtures therein to secure end portions of the adjoining batteries.

In accordance with still another preferable application of the first modular system, both the left and right side plates have notches at positions corresponding to the beams and folded pieces on upper and lower positions thereof to be in contact with the top plate and the bottom plate, and the top plate and the bottom plate are joined with each other via supporting columns fitted in the notches.

The present invention is further directed to a second modular system for accommodating batteries. The second modular system includes: a top plate and a bottom plate that respectively have a plurality of beams formed on outer surface thereof and spanned and fixed over a longitudinal axis thereof; left and right side plates that respectively join left ends and right ends of the top plate and the bottom plate; a supporting column arranged on a rear side of the top plate and the bottom plate; and a plurality of single batteries arranged side by side between the top plate and the bottom plate to locate covers of the batteries with terminals on a front side of the top plate and the bottom plate. Each of the single batteries has a plurality of ribs that are formed on a specific pair of opposite outer surfaces in such a manner as to extend in a longitudinal direction of the single battery, that is, from the front side to the rear side of the top plate and the bottom plate, and have concaves formed at regular intervals. The plurality of ribs formed on each outer surface of each single battery are in contact and joined with the plurality of ribs formed on a matching outer surface of an adjoining single battery. The joint surfaces of the adjacent single batteries form connection grooves that are defined by the concaves of the ribs and extend perpendicularly to the top plate and the bottom plate.

In the second modular system, it is preferable that both the left and right side plates have folded pieces that form upper, lower, front, and rear faces thereof and reinforcement pieces that are obtained by bending and welding ends of the folded pieces inward.

The present invention is also directed to a modular-type battery system assembly, in which a plurality of the first modular systems or the second modular systems are laid one upon another in a vertical direction, where at least the top plate, the bottom plate, the beams, the side plates, and the supporting columns are made of a metal, and the top plate and the bottom plate of the adjoining modular systems are joined together by nuts and bolts fitted in apertures formed on corners of the top plate and the bottom plate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
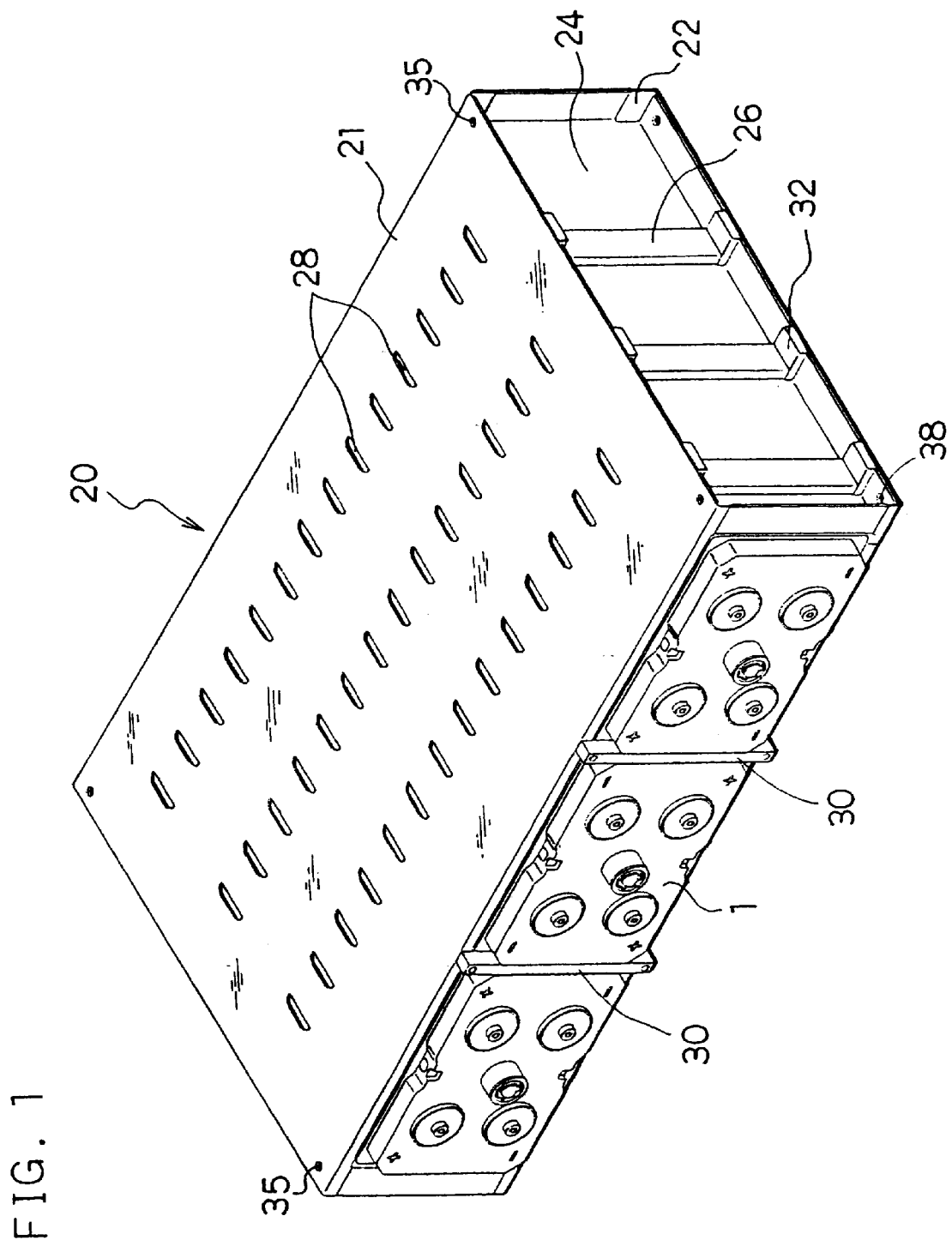
FIG. 1 is a perspective view illustrating a modular system for accommodating batteries in a first embodiment according to the present invention.

The present invention provides a sealed storage battery including: a stack of electrode plates, in which positive electrode plates and negative electrode plates are alternately laid one upon another via separators; a battery container that has an upper opening and receives the stack of electrode plates and an electrolyte therein; and a cover that has a positive electrode terminal, a negative electrode terminal, and a safety valve and seals the upper opening of the battery container, wherein the battery container has a plurality of first ribs that are formed on a specific pair of opposite outer surfaces of the battery container in such a manner as to extend in a longitudinal direction, be arranged via a predetermined first space, and have concaves formed at regular intervals.

When a plurality of these sealed storage batteries are joined together in such a manner that the covers of the batteries are located on the top and the outer surfaces of the adjoining batteries with the ribs are in contact with each other, the ribs extending in the vertical direction on the outer surfaces of the battery containers define the perpendicular connection grooves between the adjoining batteries. The heat evolved in the battery is dissipated upward through the connection grooves by the air current. When a plurality of the sealed storage batteries are arranged side by side in the sidelong orientation in such a manner that the outer surface of the adjoining batteries with the ribs are in contact with each other, the ribs of one battery are in contact and joined with the ribs of an adjoining battery. The plurality of ribs formed on each outer surface of each battery are in contact and joined with the plurality of ribs formed on a matching outer surface of an adjoining battery. The joint surfaces of the adjacent single batteries form the connection grooves that are defined by the concaves of the ribs and extend perpendicularly to the batteries in the sidelong orientation. The heat in the battery is dissipated through the connection grooves by the air current.

It is preferable that each of the plurality of first ribs has a width that is greater than a width of the predetermined first space. This structure effectively prevents the ribs on one battery from being interposed between the ribs on the adjoining battery, when the ribs of the adjacent batteries are joined with each other. This facilitates the arrangement of the plurality of batteries in the battery assembly.

It is also preferable that a plurality of rib sets, each comprising a plurality of the first ribs, are formed on the specific outer surface of the battery container in such a manner as to be arranged via a predetermined second space. This arrangement enhances the strength of the battery container, as well as ensures the dissipation of heat. In this case, it is preferable that the plurality of rib sets are formed on the pair of outer wall surfaces that receive the pressure of the stack of the electrode plates, that is, on the pair of outer wall surfaces that are parallel to the electrode plates. Here each of the plurality of rib sets preferably has a width that is greater than a width of the predetermined second space. This structure effectively prevents the ribs on one battery from being interposed between the ribs on the adjoining battery, when the ribs of the adjacent batteries are joined with each other.

It is further preferable that a plurality of second ribs having a fixed height are further formed on another pair of outer wall surfaces of the battery container that are perpendicular to the electrode plates.

The present invention also provides a modular system for accommodating batteries, which includes: a top plate and a bottom plate that respectively have a plurality of beams spanned and fixed over a longitudinal axis thereof; left and right side plates that respectively join left ends and right ends of the top plate and the bottom plate; a supporting column arranged at least on a rear side of the top plate and the bottom plate; and a plurality of single batteries arranged side by side between the top plate and the bottom plate to locate covers of the batteries with terminals on a front side of the top plate and the bottom plate. Each of the single batteries has a plurality of ribs that are formed on a specific pair of opposite outer surfaces in such a manner as to extend in a longitudinal direction of the single battery, that is, from the front side to the rear side of the top plate and the bottom plate, and have concaves formed at regular intervals. The plurality of ribs formed on each outer surface of each single battery are in contact and joined with the plurality of ribs formed on a matching outer surface of an adjoining single battery. The joint surfaces of the adjacent single batteries form connection grooves that are defined by the concaves of the ribs and extend perpendicularly to the top plate and the bottom plate.

Since the connection grooves extending perpendicularly to the top plate and the bottom plate are formed on the joint surface of the adjoining batteries, there are pathways of the air current in the connection grooves to dissipate the heat evolved in the battery. The beams spanned over the longitudinal axis of the top plate and the bottom plate function to support the plurality of batteries arranged side by side. The presence of the beams causes empty spaces to be defined between the top plate and the bottom plate and the batteries in each modular system and between the adjoining modular systems. The empty spaces effect the desirable temperature balance between the adjoining batteries.

In a power source system where a plurality of the modular systems are laid one upon another and a large number of batteries are assembled, the arrangement of the present invention effectively prevents a temperature difference among the batteries arranged at different positions. This ensures the high reliability of the resulting power source system.

The modular system according to the present invention has a rigid structure that enables a plurality of modular systems to be laid one upon another simply by working of metal plates.

The following describes a modular system 20 for accommodating batteries according to the present invention as a preferred embodiment.

The structure of a single battery 1 is described by referring to FIGS. 13 through 16.

The single battery 1 includes a battery container 2, which has an upper opening and is composed of a synthetic resin, for example, polypropylene, and a cover 3 that is composed of the same synthetic resin and thermally welded to the upper opening. The battery container 2 receives therein an electrolyte and a stack of electrode plates, in which positive electrode plates and negative electrode plates are alternately laid one upon another via separators. The cover 3 has a higher projection element 5 formed on the center thereof and a narrow base element 4 surrounding the projection element 5. A positive electrode terminal 6, a negative electrode terminal 7, and a safety valve 8 are protruded upright from the projection element 5.

The single battery 1 is a sealed lead-acid battery having the nominal voltage of 2V, the nominal capacity of 1200 Ah, the weight of approximately 90 kg, and the total height of 580 mm.

Figure 3:
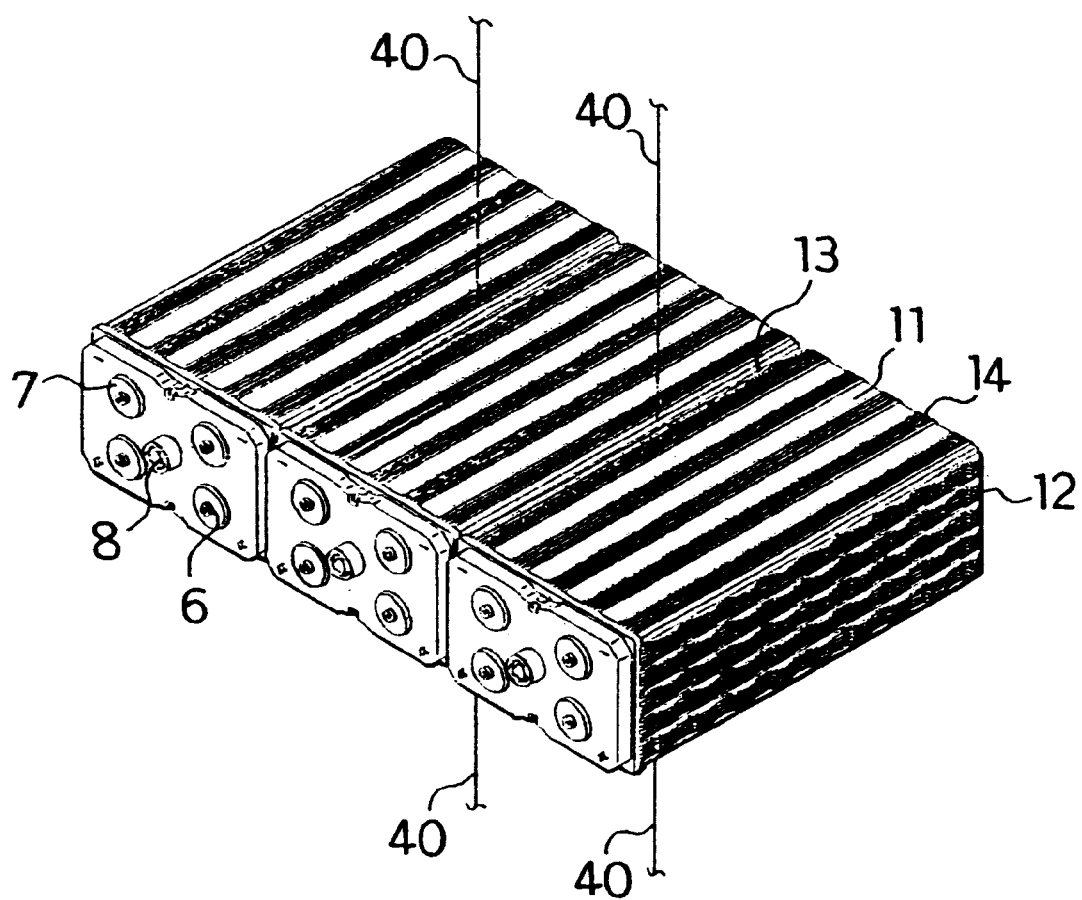
FIG. 3 is a perspective view illustrating a battery assembly accommodated in the modular system of FIG. 1.
Figure 13:
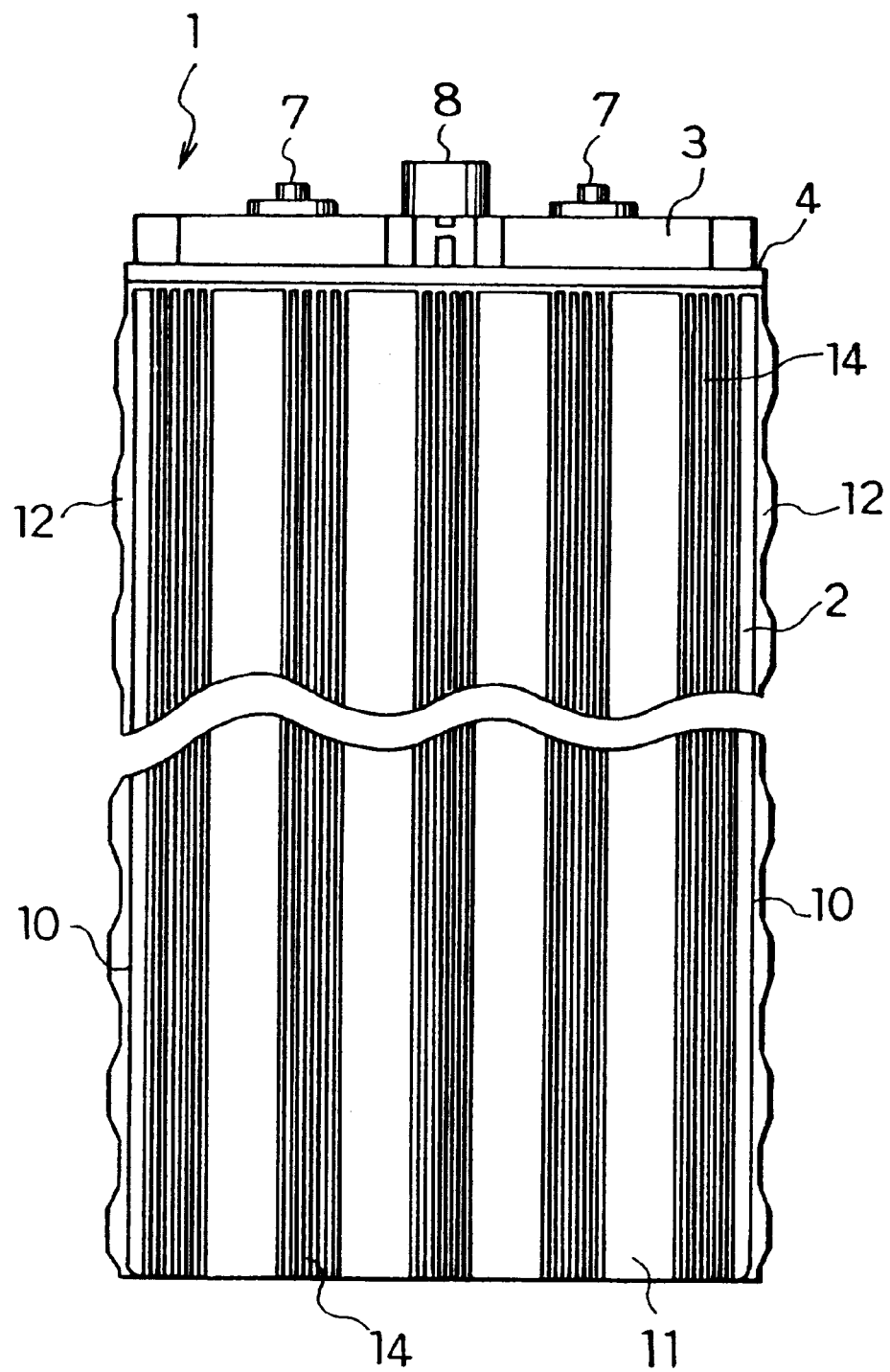
FIG. 13 is a front view illustrating a single battery accommodated in the modular system.
Figure 14:
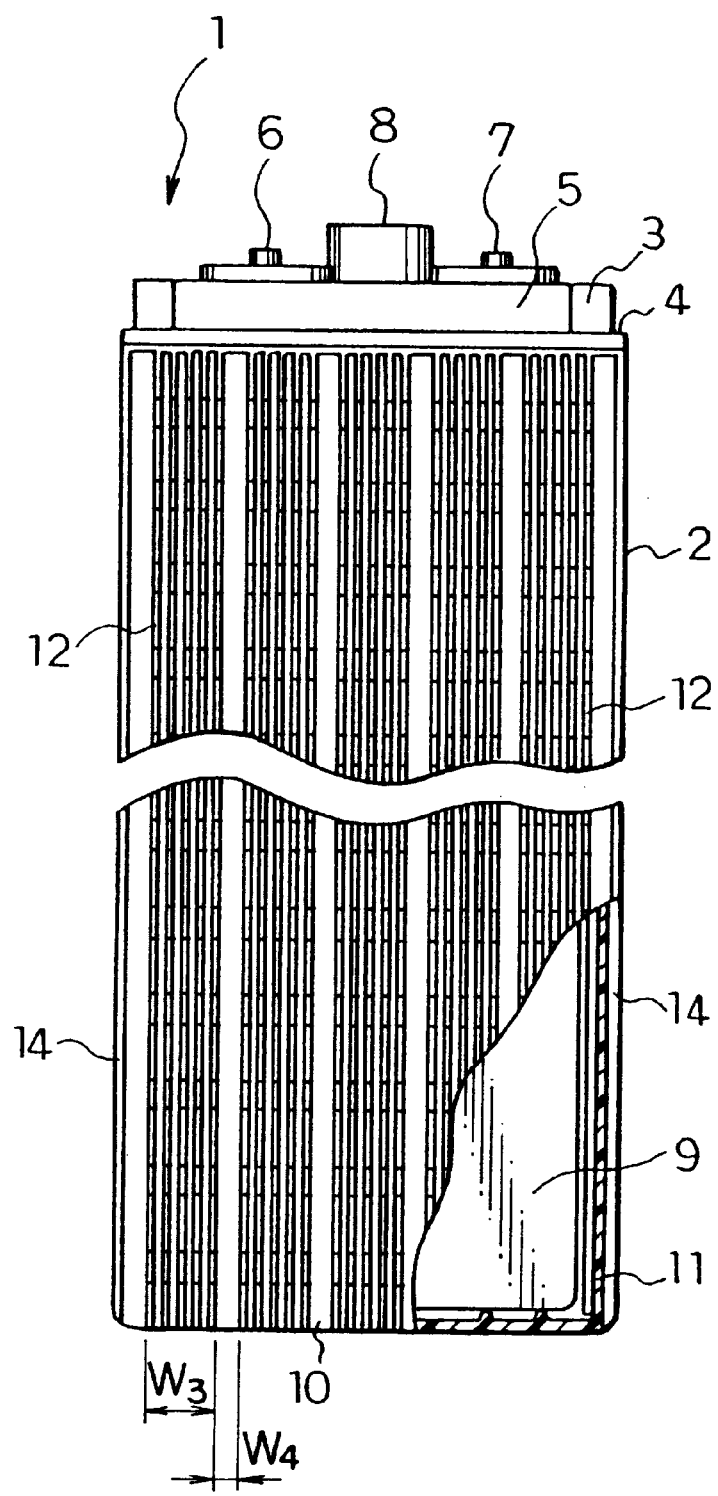
FIG. 14 is a side view of the single battery.
Figure 15:
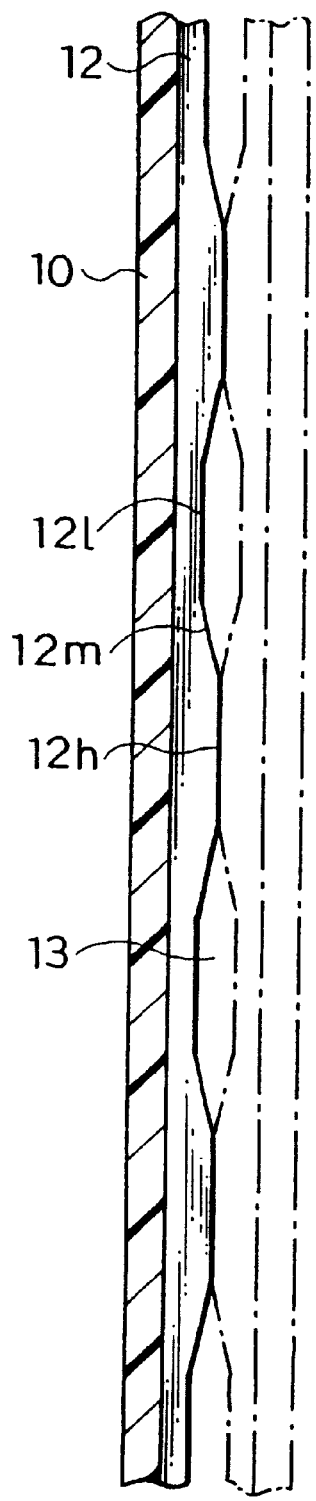
FIG. 15 is a sectional view illustrating ribs formed on each single battery.
Figure 16:
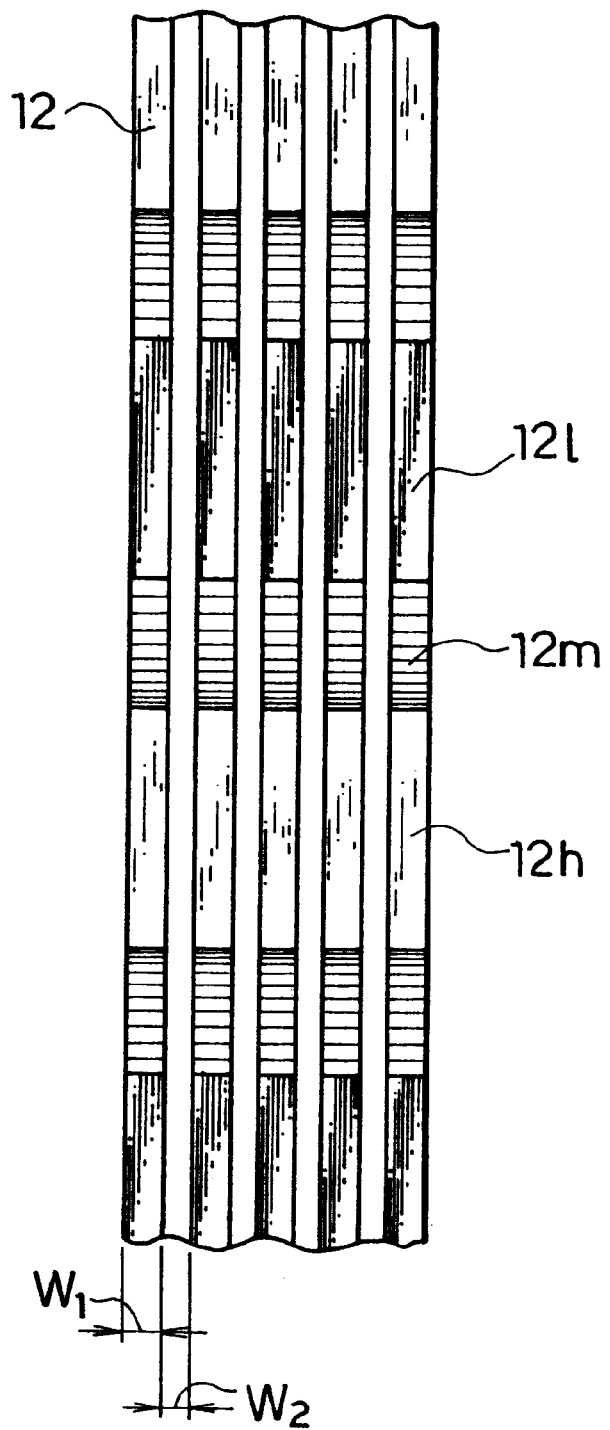
FIG. 16 is a front view illustrating an essential part of rib sets.

The battery container 2 has a pair of first side walls 10 that have a narrower width and are parallel to the electrode plate 9, a pair of second side walls 11 that have a greater width, and a bottom wall. The width of the first side wall 10 is 180 mm, whereas the total width of the second side wall 11 including ribs (discussed later) is 280 mm. Five rib sets, each consisting of five ribs 12, are formed at intervals of approximately 8 mm on the first side wall 10. The five ribs 12 included in each rib set extend in the longitudinal direction of the first side wall 10, have the width of 3.5 mm, and are arranged at intervals of 2 mm. Each rib 12 has repetitions of a higher portion 12h having the length of 20 mm in the longitudinal direction and the height of 5 mm, a lower portion 12l having the length of 20 mm and the height of 2 mm, and a middle portion 12m interposed between the higher portion 12h and the lower portion 12l as shown in FIG. 13. When a plurality of the single batteries 1 are aligned side by side in such a manner that the first side wall 10 of one single battery 1 is in direct contact with the opposite first side wall 10 of an adjoining single battery 1 as shown in FIG. 3, the higher portions 12h of the ribs 12 on the first side wall 10 are respectively joined with the higher portions 12h of the mating ribs 12 on the opposite side wall 10. The close contact of the matching first side walls 10 forms connection grooves 13 that are defined by the lower portions 12l and the middle portions 12m of the ribs 12, which constitute concaves, and that connect the ribs 12 with one another. In FIG. 16, W 1 and W 2 designate the width of the rib 12 and the width of the concave formed between the ribs 12, respectively. In FIG. 14, W 3 and W 4 designate the width of the rib set consisting of five ribs 12 and the interval between the rib sets, respectively.

Five rib sets, each consisting of five ribs 14, are formed at intervals of approximately 26 mm on the second side wall 11. The five ribs 14 included in each rib set extend in the longitudinal direction of the second side wall 11, have the width of 3.5 mm and the height of 4 mm, and are arranged at intervals of 2 mm.

Both the first side wall 10 and the second side wall 11 have the thickness of 4 mm. The rib sets are arranged at narrow intervals on the first side walls 10 that receive the pressure from the stack of electrode plates, in order to ensure the sufficient strength that prevents deformation of the first side walls 10 due to expansion of the stack of electrode plates. The height of the lower portions 121 of the ribs 12 and the height of the ribs 14 are determined to match the height of the opening fringe of the battery container 2, which is welded to the cover 3. The higher portions 12h of the ribs 12 are protruded in the horizontal direction of the battery container 2 to define the lateral width of the single battery 1.

The following describes a modular system 20 for accommodating a plurality of the single batteries 1 discussed above.

Embodiment 1

Figure 2:
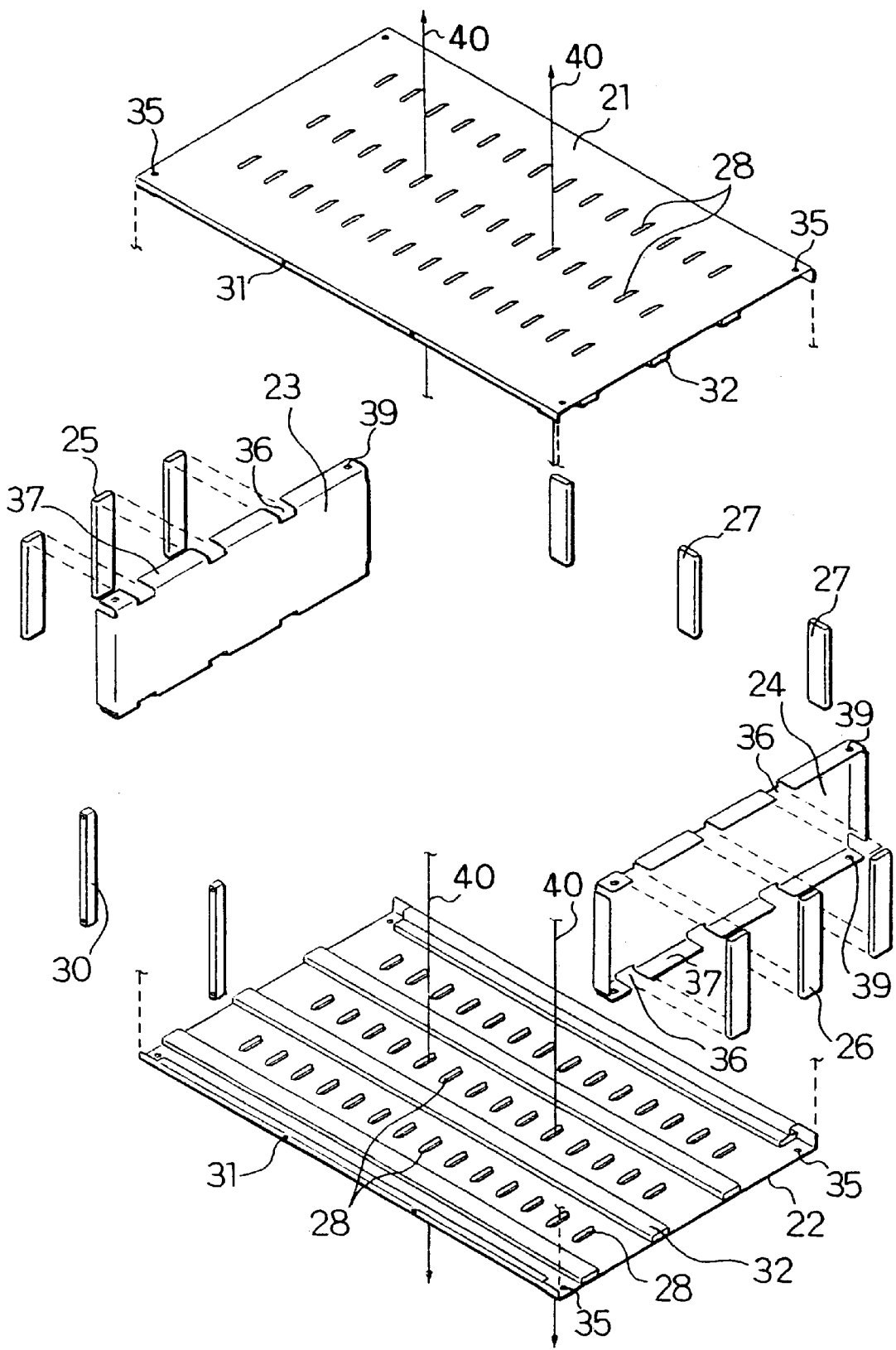
FIG. 2 is a decomposed perspective view illustrating the modular system of FIG. 1.

Referring to FIGS. 1 and 2, the modular system 20 primarily includes a top plate 21, a bottom plate 22, left and right side plates 23 and 24, supporting columns 25 and 26 combined respectively with the side plates 23 and 24, and supporting columns 27 arranged on the back side of the modular system 20.

The top plate 21 and the bottom plate 22 are cut out of a steel plate having the thickness of 2 mm to have the length of 930 mm in the longitudinal direction and the width of 560 mm. Both the top plate 21 and the bottom plate 22 have three rows of openings 28. Each row includes fourteen openings 28 aligned in the longitudinal direction of the plate. It is preferable that the opening 28 has a rectangular or ellipsoidal shape extending along the width of the plate. In this embodiment, each opening 28 has a substantially rectangular shape having the length of 75 mm and the width of 14 mm. The openings 28 may be punched out, but are formed by the press molding method in this embodiment.

Figure 4:
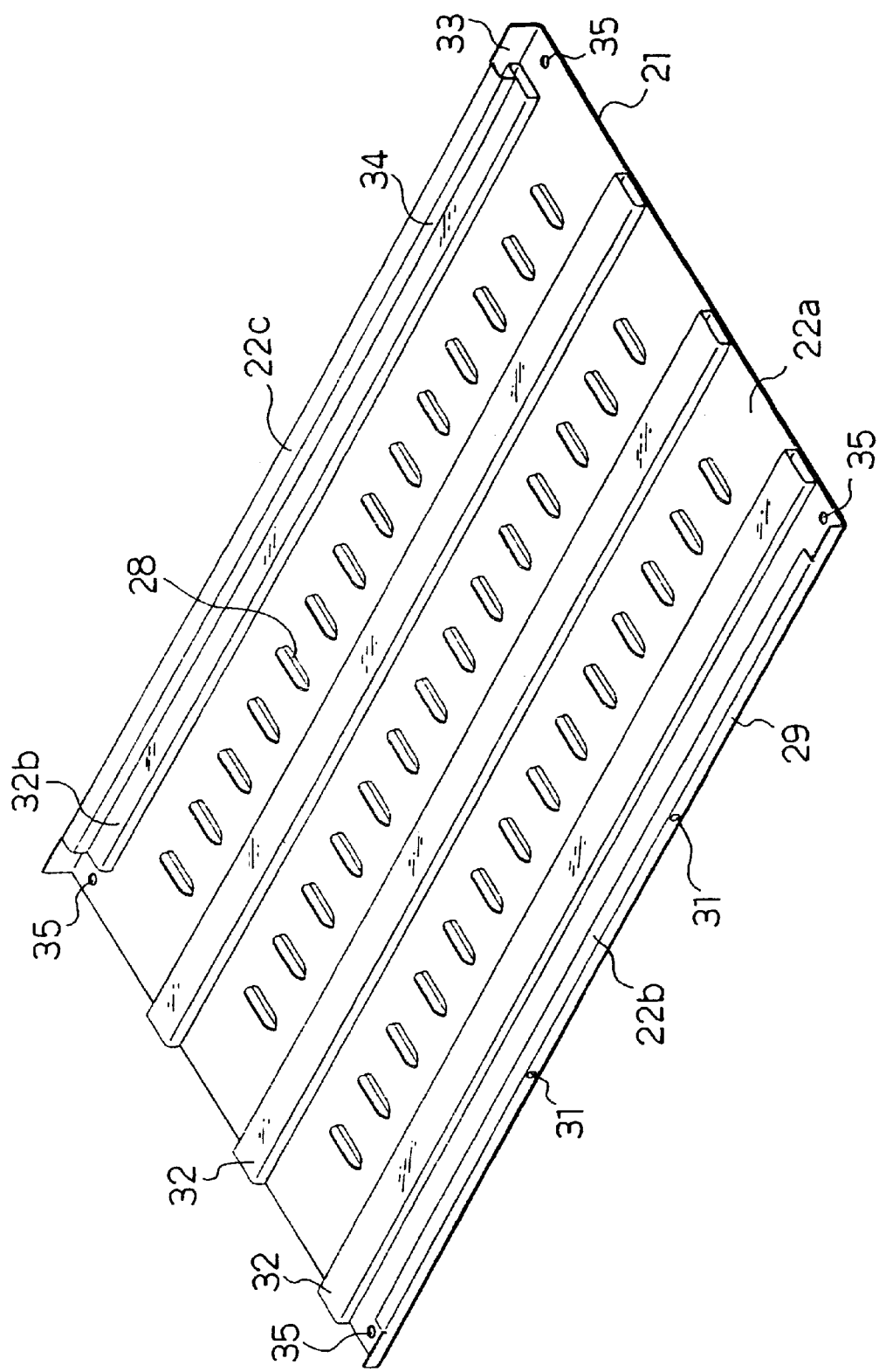
FIG. 4 is a perspective view illustrating a bottom plate of the modular system of FIG. 1.
Figure 5:
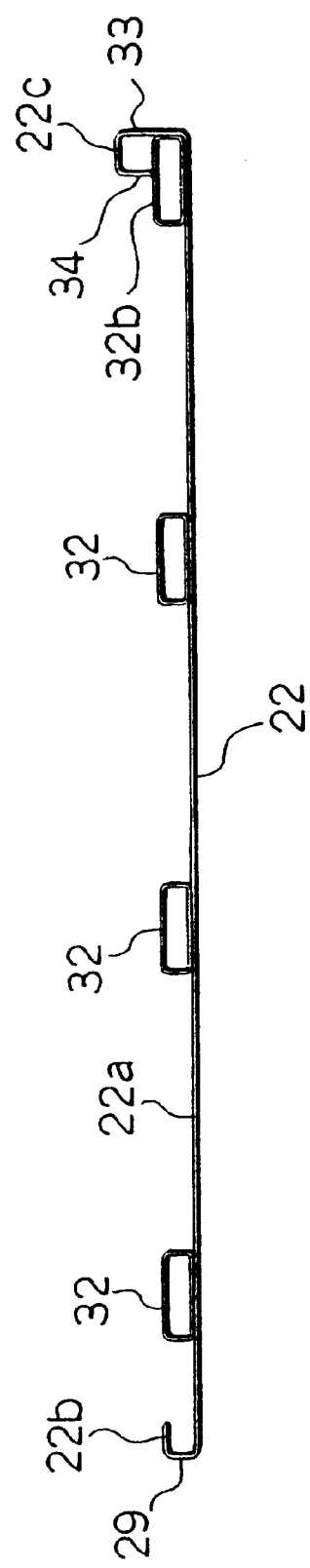
FIG. 5 is a right side view of the bottom plate.

Referring to FIGS. 4 and 5, the bottom plate 22 has a projected end piece 29 obtained by bending the bottom plate 22 first upward at a right angle on a specific line that is 30 mm from the front end thereof and then inward at a right angle on another line that is 15 mm from the front end. The projected end piece 29 forms a second plane 22b at a position higher than that of a first plane 22a, where the openings 28 are present. The projected end piece 29 has apertures 31 in which fixtures 30 for anchoring the single batteries 1 are fitted in. Four beams 32 and 32b of rectangular tubes that are made of a steel plate and have the height of 15 mm and the width of 30 mm are welded to the inner face of the bottom plate 22 to be arranged across the respective rows of the openings 28.

The backside end of the bottom plate 22 has another projected end piece 33 having the height of 30 mm, a suspended piece 34 whose end is in contact with the upper surface of the backside beam 32b, and a third plane 22c defined by the projected end piece 33 and the suspended piece 34.

The second plane 22b, the third plane 22c, the suspended piece 33, and the backside beam 32b are cut at the position of 35 mm from each end, so as to have the shorter length than the length of the bottom plate 22. The bottom plate 22 also has apertures 35 formed in the vicinity of four corners.

The top plate 21 has an identical structure with that of the bottom plate 22. The surface and the rear face of the top plate 21 are inversion of those of the bottom plate 22. The common top plate 21 and bottom plate 22 facilitate the management of parts.

Figure 6:
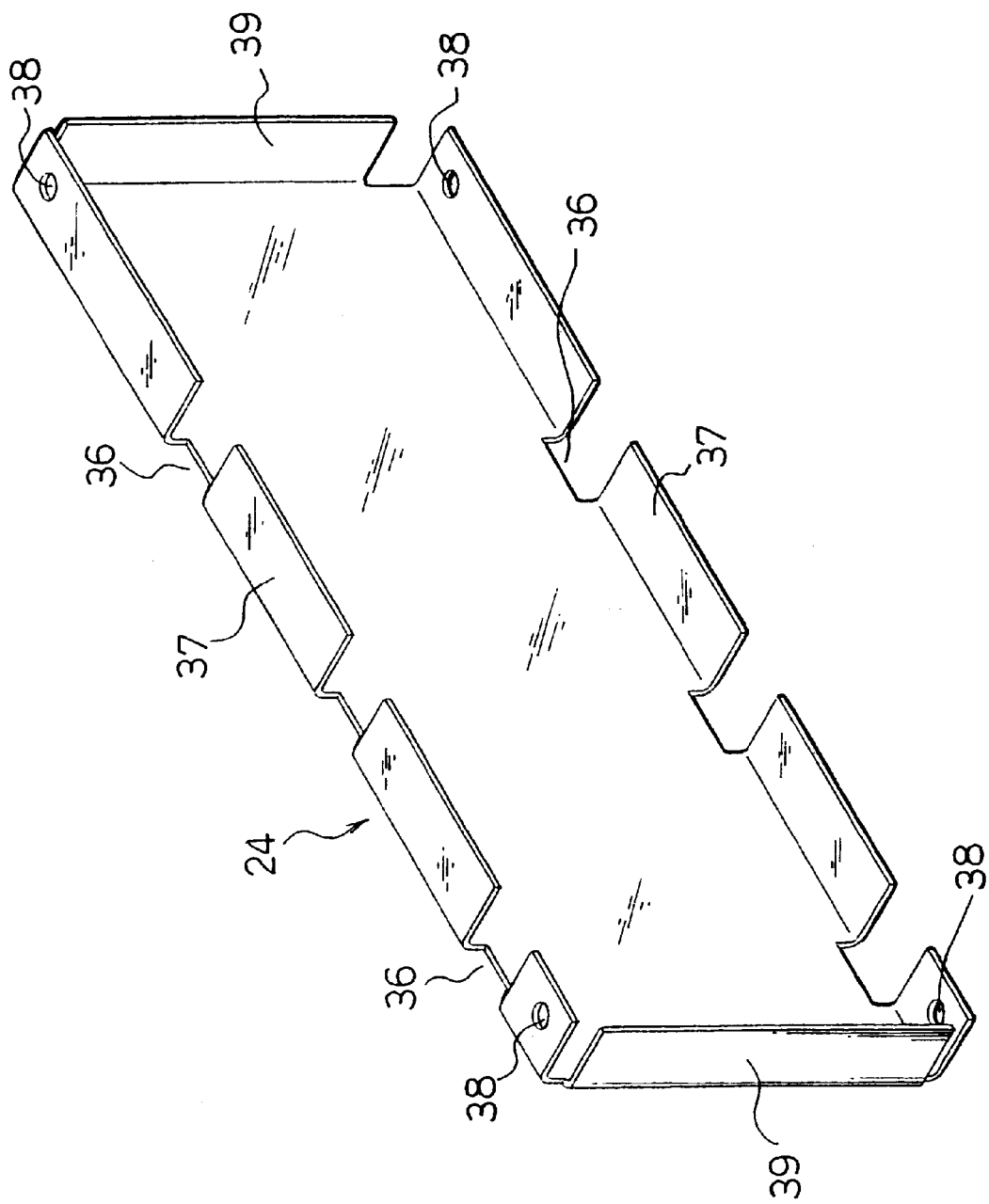
FIG. 6 is a perspective view illustrating a side plate of the modular system of FIG. 1.

The side plates 23 and 24 are arranged on the left side and the right side of the top plate 21 and the bottom plate 22 to be interposed between the top plate 21 and the bottom plate 22. The side plates 23 and 24 are formed symmetrically. The structure of the right side plate 24 is described by referring to FIG. 6. The side plate 24 has notches 36 on both the upper end and the lower end thereof. The notches 36 correspond to and receive the beams 32 of the top plate 21 and the bottom plate 22. The side plate 24 also has upper and lower folded pieces 37 that are bent outward at a right angle to be brought into contact with the top plate 21 and the bottom plate 22 respectively. The upper and lower folded pieces 37 have apertures 38, which are formed in both the front end and the backside end of the folded pieces 37 corresponding to the apertures 35 of the top plate 21 and the bottom plate 22. The side plate 24 also has front and backside folded pieces 39 that are bent outward at a right angle.

The casing of the modular system 20 is assembled according to the following process. The side plates 23 and 24 are joined with the top plate 21 and the bottom plate 22 in such a manner that the apertures 35 of the top plate 21 and the bottom plate 22 connect with the apertures 38 of the side plates 23 and 24. The process then welds the upper and lower folded pieces 37 of the side plates 23 and 24 to the inner surface of both ends of the top plate 21 and the bottom plate 22.

The process also welds the upper and lower end faces of the supporting columns 25 and 26 fitted in the notches 36 of the side plates 23 and 24 to the beams 32 of the top plate 21 and the bottom plate 22. The process further welds the upper and lower end faces of the supporting columns 27 to the third planes 22c of the top plate 21 and the bottom plate 22.

The supporting columns 25, 26, and 27 are formed to a rectangular tubular shape by folding the steel plate. When the top plate 21, the bottom plate 22, and the left and right side plates 23 and 24 are joined together, the functions of the beams 32 welded to the inner surface of the top plate 21 and the bottom plate 22 as well as the supporting columns 25 through 27 welded between the top plate 21 and the bottom plate 22 cause the resulting modular system 20 to have a rigid structure. This rigid structure ensures the sufficient strength when a plurality of modular systems 20 are laid one upon another.

The assembled casing of the modular system 20 is set up to locate the front side on the top, and three single batteries 1 aligned side by side are then inserted downward into the casing of the modular system 20. The interval between the beams 32 of the top plate 21 and the beams 32 of the bottom plate 22 is identical with the width of the narrower first side wall 10 of the single battery 1. Because of the own weight of the battery 1, the ribs 14 of the fixed height formed on the second side walls 11 slide along the surface of the second planes 22b and the beams 32 of the top plate 21 and the bottom plate 22, so that the bottom of the battery 1 is located on and secured by the suspended pieces 34 of the top plate 21 and the bottom plate 22.

The fixtures 30 are then screwed into the apertures 31 formed in the projected end pieces 29 of the top plate 21 and the bottom plate 22. This clamps the base elements 4 of the covers 3 of the adjoining batteries 1 and thereby fixes the single batteries 1.

The modular system 20 with the single batteries 1 accommodated therein is then fallen down to locate the covers 3 of the batteries 1 on the front side as shown in FIG. 1. The above assembly causes the single batteries 1 to be arranged between the top plate 21 and the bottom plate 22 in such a manner that the higher portions 12h of the ribs 12 formed on the first side wall 10 of one single battery 1 are in close contact with the higher portions 12h of the ribs 12 of the adjoining single battery 1. There are accordingly the connection grooves 13 defined by the lower portions 12l and the middle portions 12m of the ribs 12. As shown by arrows 40 in FIGS. 2 and 3, some of these connection grooves 13 are located on the straight lines that join the openings 28 of the top plate 21 and the bottom plate 22. Both the top plate 21 and the bottom plate 22 have a large number of the other openings 28. In the case where the temperature of the single battery 1 increases, the connection grooves 13 formed between the adjoining single batteries 1 function to accelerate the air current and cool the hot battery 1 down. There are empty spaces between the beams 32 to connect the openings 28. These empty spaces function to equalize the temperature of the adjoining batteries 1.

The following describes a modular-type battery system assembly prepared by laying the modular systems 20 discussed above one upon another, with the drawings of FIGS. 7 and 8.

Figure 8:
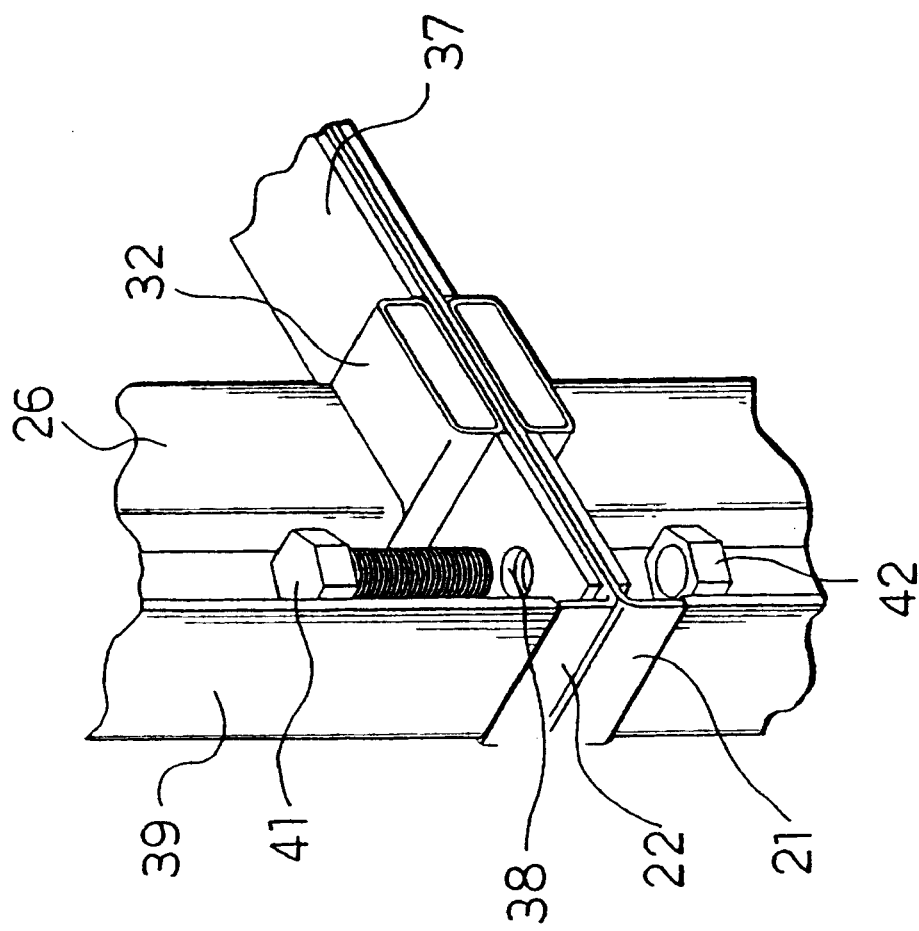
FIG. 8 is a perspective view illustrating a joint of the adjoining modular systems in the modular-type battery system assembly of FIG. 7.

Referring to FIG. 8, an upper modular system 20 is laid on a lower modular system 20, while the positions of the apertures 35 formed in the four corners of the top plate 21 of the lower modular system 20 are made to be coincident with those of the apertures 35 formed in the four corners of the bottom plate 22 of the upper modular system 20. The process then inserts bolts 41 into the apertures 35 of the top plate 21 and the bottom plate 22 and the connecting apertures 39 of the side plates 23 and 24 and clamps the bolts 41 with nuts 42, in order to join the two modular systems 20 with each other. A plurality of modular systems 20 are laid one upon another in this manner.

The plane of the top plate 21 of the lower modular system 20 is in direct contact with the plane of the bottom plate 22 of the upper modular system 20. Since the top plate 21 and the bottom plate 22 have an identical design, the corresponding openings 28 formed in the top plate 21 and the bottom plate 22 are located at identical positions. The openings 28 are thereby aligned on vertical straight lines. The current of the warmed air is flown from the lower modular system 20 to the upper modular system 20 and further to the outside via some of these openings 28. The other openings 28 and the empty spaces between the beams 32 function to homogenize the temperature balance. This arrangement effectively prevents the temperature of a single battery located inside the modular system 20 from extremely increasing.

Figure 7:
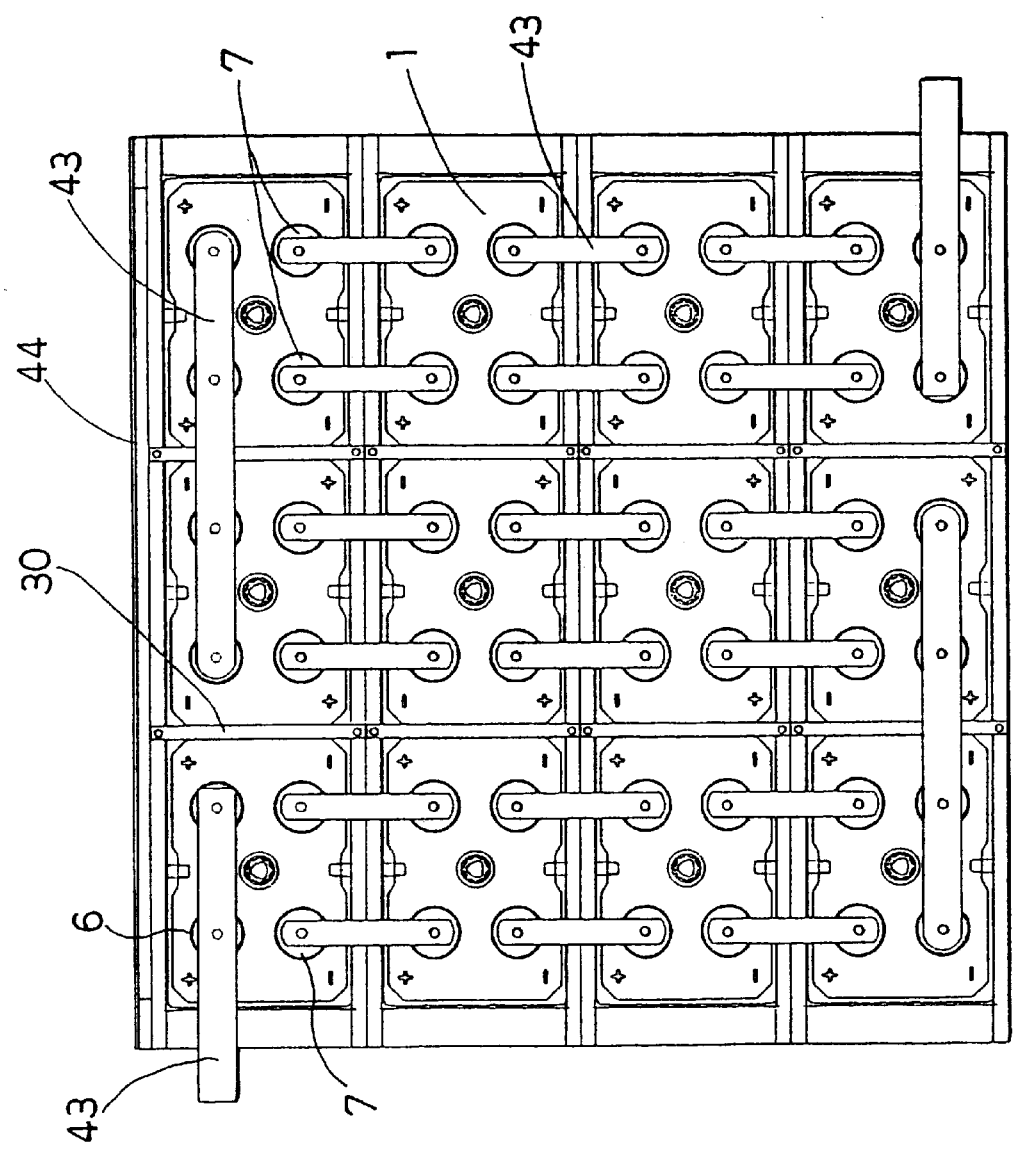
FIG. 7 is a front view illustrating a modular-type battery system assembly obtained by laying the modular systems of FIG. 1 one upon another.

A plurality of modular systems 20 are successively laid one upon another in the above manner and integrated to give a large-sized modular-type battery system assembly shown in FIG. 7. In this embodiment, the single batteries 1 in the modular systems 20 are connected in series with connectors 43. The modular-type battery system assembly is generally used over a long time period. In order to prevent the dust from being invaded through the openings of the upper-most portion of the battery system assembly, the top plate 21 of the upper-most modular system 20 is further covered with a cover plate 44 via a predetermined space. The cover plate 44 has a large number of openings (not shown) for the purpose of dissipation of the heat. This structure effectively prevents invasion of dust into the upper-most modular system 20 in the modular-type battery system assembly.

The modular-type battery system assembly shown in FIG. 7 is prepared by laying the four modular systems 20 upon one another. Each sealed lead-acid storage battery has two positive electrode terminals and two negative electrode terminals. These positive electrode terminals and negative electrode terminals are connected in series with the connectors 43 to give a high voltage of 24 V in this embodiment. According to the requirements, a plurality of modular-type battery system assemblies can be connected to ensure the higher output voltage. When the higher capacity is required, the batteries in each modular system 20 and the plurality of modular-type battery system assemblies may be connected in parallel.

The above embodiment regards the modular system that is preferable for the applications with evolution of relatively large heat. The following describes another modular system of a simpler structure that is preferable for the applications with evolution of relatively small heat.

Embodiment 2

Figure 9:
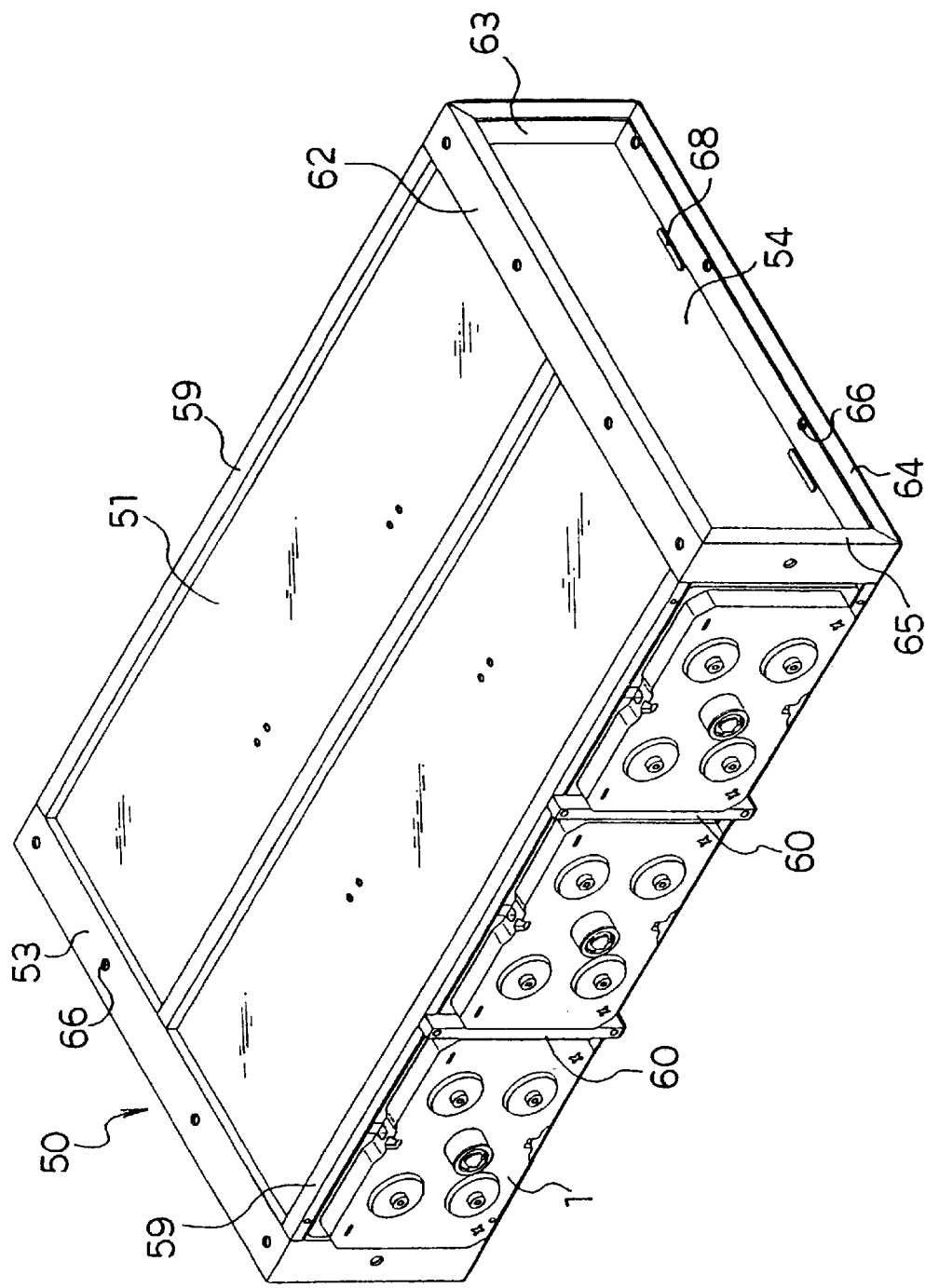
FIG. 9 is a perspective view illustrating another modular system for accommodating batteries in a second embodiment according to the present invention.
Figure 10:
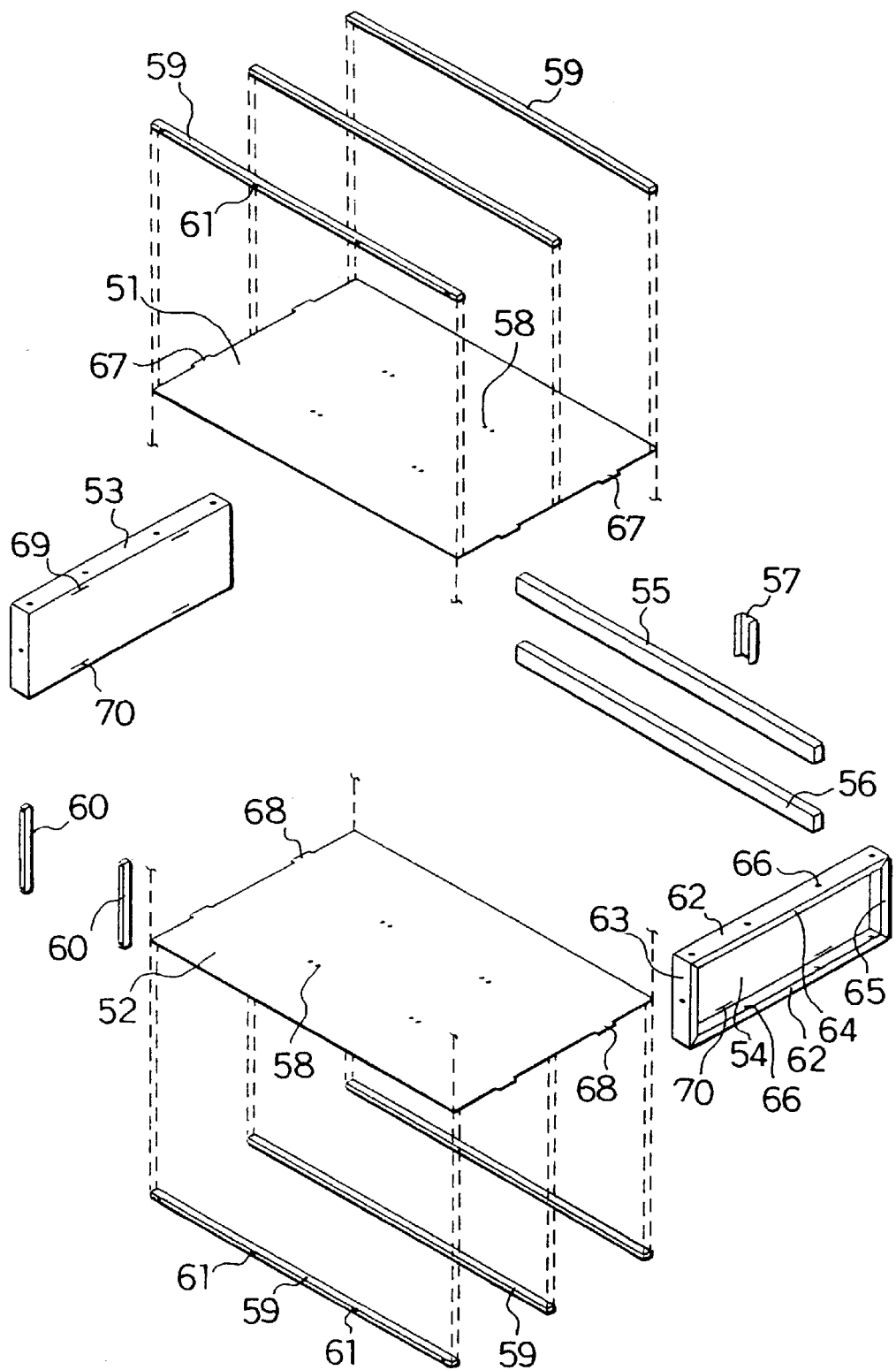
FIG. 10 is a decomposed perspective view illustrating the modular system of FIG. 9.

Referring to FIGS. 9 and 10, the modular system 50 mainly includes a top plate 51, a bottom plate 52, left and right side plates 53 and 54, beams 55 and 56 that join the side plates 53 and 54 with each other on the upper and lower portions of the back side and are respectively set on the top plate 51 and the bottom plate 52, and a supporting column 57 that connects the beams 55 and 56 with each other.

Both the top plate 51 and the bottom plate 52 have four pairs of air through holes 58 and three beams 59 welded to the outer surface thereof. Threaded holes 61, which fixtures 60 of the batteries 1 are fitted in, are formed in the front beams 59 of the top plate 51 and the bottom plate 52.

The side plate 54 is prepared by bending a quasi-cross shaped steel plate, and includes folded pieces 62 and 63 that form the upper, lower, front, and rear faces of the side plate 54 and reinforcement pieces 64 and 65 that are obtained by further bending and welding the ends of the folded pieces 62 and 63 at a right angle. The upper and lower folded pieces 62 have bolt-receiving apertures 66, which enable a plurality of the modular systems 50 to be joined together with bolts and nuts. The side plate 53 has an identical structure to that of the side plate 54.

The top plate 51 and the bottom plate 52 have projected pieces 67 and 68, respectively. These projected pieces 67 and 68 are inserted into slits 69 and 70 formed in the upper and lower portions of the side plates 53 and 54.

In the modular system 50 discussed above, the second side walls 11 of the respective single batteries 1 are in contact with the inner faces of the top plate 51 and the bottom plate 52, whereas the first side walls 10 of the end single batteries 1 are in contact with the inner faces of the side plates 53 and 54. The bottom walls of the batteries 1 are in contact with the beams 55 and 56 on the back side.

The beams 59 spanned over the top plate 51 and the bottom plate 52 and the folded pieces 62 and 63 formed in the tubular shape on the side plates 53 and 54 ensure the sufficient strength of the resulting modular system 50. A plurality of such modular systems 50 are laid one upon another to give a large-sized modular-type battery system assembly.

Like the first embodiment discussed above, the facing ribs 12 on the joint surfaces of the adjoining batteries define the connection grooves 13 that enable the air current. The air through holes 58 formed in the top plate 51 and the bottom plate 52 and the open rear side of the modular system 50 also ensure the air current and prevent the temperature of the battery 1 from extremely increasing. When a plurality of the modular systems 50 are laid one upon another, empty spaces are formed between the beams fixed to the top plate and the bottom plate in the adjoining modular systems. These empty spaces function to homogenize the temperature of the batteries included in the modular systems.

Embodiment 3

Figure 11:
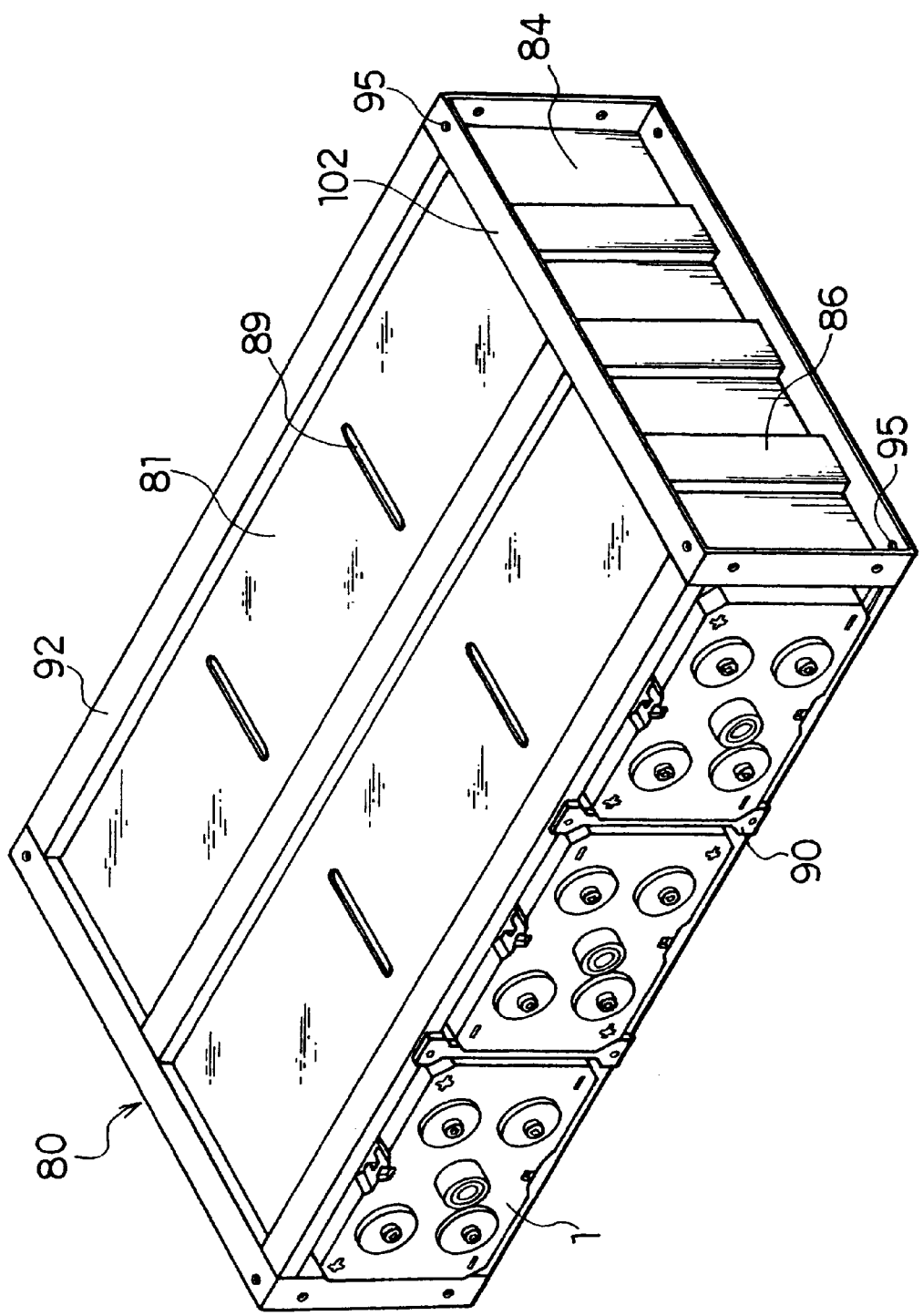
FIG. 11 is a perspective view illustrating still another modular system for accommodating batteries in a third embodiment according to the present invention.
Figure 12:
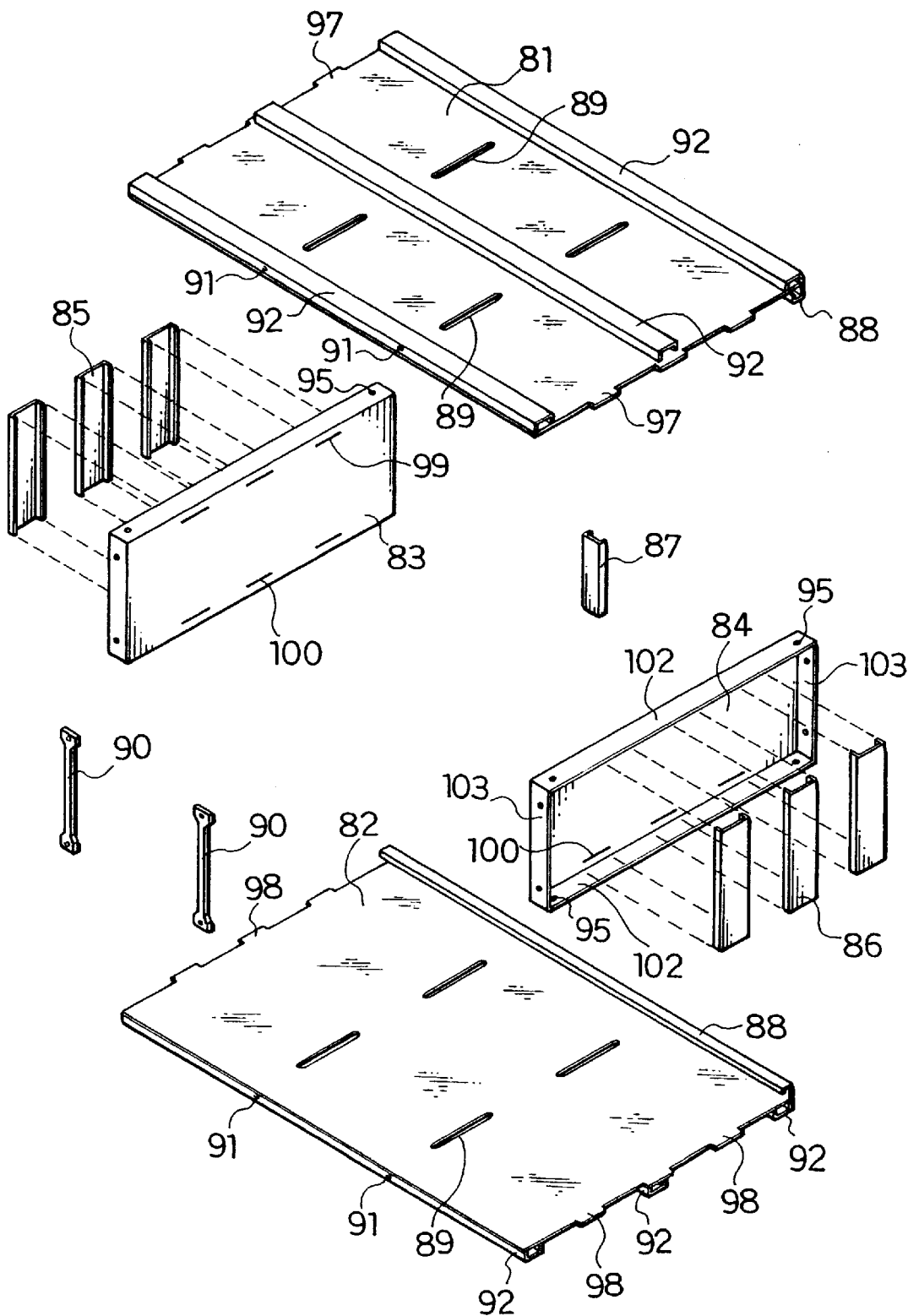
FIG. 12 is a decomposed perspective view illustrating the modular system of FIG. 11.

Another modular system 80 is described with the drawings of FIGS. 11 and 12 as a third embodiment according to the present invention. The modular system 80 shown in FIG. 11 mainly includes a top plate 81, a bottom plate 82, left and right side plates 83 and 84, supporting columns 85 and 86 respectively connected with the side plates 83 and 84, and a supporting column 87 disposed on the rear side.

The top plate 81 and the bottom plate 82 respectively have three U-shaped beams 92, which are prepared by bending a steel plate and welded to the outer surface of the plates 81 and 82. The rear end of both the top plate 81 and the bottom plate 82 is folded inward three times to form a projection element 88. Both ends of the supporting column 87 are welded to the top planes of projection elements 88.

The top plate 81 and the bottom plate 82 respectively have a plurality of air through holes 89, which correspond to the connection grooves 13 formed on the joint surfaces of the adjoining batteries 1 that are arranged between the top plate 81 and the bottom plate 82. The front beam 92 welded on the front side of the top plate 81 and the bottom plate 82 has threaded holes 91 for receiving fixtures 90 of the batteries 1 therein.

The side plate 84 is prepared by bending a quasi-cross shaped steel plate, and includes folded pieces 102 and 103 that form the upper, lower, front, and rear faces of the side plate 84 and are welded to each other. The upper and lower folded pieces 102 have bolt-receiving apertures 95, which enable a plurality of the modular systems 80 to be joined together with bolts and nuts. The side plate 83 has an identical structure to that of the side plate 84.

The top plate 81 and the bottom plate 82 respectively have projected pieces 97 and 98 on both the left and right sides thereof. These projected pieces 97 and 98 are inserted into slits 99 and 100 formed in the upper and lower portions of the side plates 83 and 84. The supporting columns 86 are welded between the upper and lower folded pieces 102 of the side plate 84 to cover the slits 99 and 100 and prevent the projected pieces 97 and 98 that are protruded through the slits 99 and 100 from being directly exposed. The supporting columns 85 are welded to the side plate 83 in a similar manner.

In the modular system 80 discussed above, the second side walls 11 of the respective single batteries 1 are in contact with the inner faces of the top plate 81 and the bottom plate 82, whereas the first side walls 10 of the end single batteries 1 are in contact with the inner faces of the side plates 83 and 84. The bottom walls of the batteries 1 are in contact with the front planes of the projection elements 88 formed on the rear side of the top plate 81 and the bottom plate 82.

The beams 92 spanned over the top plate 81 and the bottom plate 82, the folded pieces 102 and 103 that are connected to each other in a frame-like shape on the side plates 83 and 84, and the supporting columns 85 and 86 connected with the side plates 83 and 84 ensure the sufficient strength of the resulting modular system 80. The beams 92 and the supporting columns 85 and 86 are obtained by folding a steel plate in a U shape. This favorably reduces the weight of the whole modular system 80. This structure is especially advantageous when a plurality of the modular systems 80 are laid one upon another, and facilitates the fabrication of a large-sized modular-type battery system assembly.

Like in the first and the second embodiments discussed above, in the structure of the third embodiment, the air through holes 89 formed in the top plate 81 and the bottom plate 82 corresponding to the connection grooves 13, which are defined by the facing ribs 12 on the joint surfaces of the adjoining batteries 1, to ensure the air current and prevent the temperature of the battery 1 from extremely increasing. When a plurality of the modular systems 80 are laid one upon another, empty spaces are formed between the beams fixed to the top plate and the bottom plate in the adjoining modular systems. These empty spaces function to homogenize the temperature of the batteries included in the modular systems.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

As described above, when a plurality of single batteries are aligned side by side, the connection grooves are formed on the joint surfaces of the facing ribs on the battery containers in the adjoining batteries to extend in the direction perpendicular to the top plate and the bottom plate of the modular system. The connection grooves ensure the dissipation of heat of the batteries by the natural current of the air. The top plate and the bottom plate disperse and dissipate the heat. Even when the batteries are used over a long time period, this structure effectively prevents the temperature difference between the batteries and ensures the sufficient reliability of the resulting modular-type battery system assembly, which is often used as a power source system. The modular-type battery system assembly has a rigid structure including a plurality of modular systems that are laid one upon another and joined together simply by working of metal plates.

What is claimed is:

1. A sealed storage battery comprising: a stack of electrode plates, in which positive electrode plates and negative electrode plates are alternately laid one upon another via separators; a battery container that has an upper opening and receives the stack of electrode plates and an electrolyte therein; and a cover that has a positive electrode terminal, a negative electrode terminal, and a safety valve that seals the upper opening of the battery container, wherein the battery container has a plurality of first ribs that are formed on a specific pair of opposite outer surfaces of the battery container in such a manner as to extend in a longitudinal direction, each rib extending substantially the entire length of the surfaces, are arranged at a predetermined first spacing, and have concaves formed thereon at regular intervals.

2. The sealed storage battery in accordance with claim 1, wherein each of the plurality of first ribs has a width that is greater than a width of the predetermined first space.

3. The sealed storage battery in accordance with claim 1, wherein a plurality of rib sets, each comprising a plurality of the first ribs, are formed on the specific outer surfaces of the battery container in such a manner as to be arranged via a predetermined second space.

4. The sealed storage battery in accordance with claim 3, wherein each of the plurality of rib sets has a width that is greater than a width of the predetermined second space.

5. The sealed storage battery in accordance with claim 1, wherein the plurality of first ribs are formed on one pair of outer wall surfaces of the battery container that are parallel to the electrode plates, and a plurality of second ribs having a fixed height are further formed on another pair of outer wall surfaces of the battery container.

6. The sealed storage battery in accordance with claim 1, wherein the specific pair of opposite outer surfaces on which the first ribs are formed is a pair of outer walls that are parallel to the major surfaces of the electrode plates.

7. A battery assembly comprising a plurality of sealed storage batteries that are arranged side by side, wherein each sealed storage battery has a plurality of ribs that are formed on a specific pair of opposite outer surfaces in such a manner as to extend in a longitudinal direction of the sealed storage battery, each rib extending substantially the entire length of the surfaces, and have concaves formed thereon at regular intervals, the plurality of ribs formed on each outer surface of each sealed storage battery are in contact and joined with the plurality of ribs formed on a matching outer surface of an adjoining sealed storage battery, and the joint surfaces of the adjacent sealed storage batteries form connection grooves that are defined by the concaves of the ribs and extend perpendicularly to the longitudinal direction of the sealed storage battery.

8. The battery assembly in accordance with claim 7, wherein the specific pair of opposite outer surfaces on which the first ribs are formed is a pair of outer walls that are parallel to the major surfaces of the electrode plates.

9. A modular system for accommodating batteries, said modular system comprising: a top plate and a bottom plate that respectively have a plurality of beams spanned and fixed over a longitudinal axis thereof, left and right side plates that respectively join left ends and right ends of the top plate and the bottom plate; a supporting column arranged at least on a rear side of the top plate and the bottom plate; and a plurality of single batteries arranged side by side between the top plate and the bottom plate to locate covers of the batteries with terminals on a front side of the top plate and the bottom plate, wherein each of the single batteries has a plurality of ribs that are formed on a specific pair of opposite outer surfaces in such a manner as to extend in a longitudinal direction of the single battery, each rib extending substantially the entire length of the surfaces, and have concaves formed thereon at regular intervals, the plurality of ribs formed on each outer surface of each single battery are in contact and joined with the plurality of ribs formed on a matching outer surface of an adjoining single battery, and the joint surfaces of the adjacent single batteries form connection grooves that are defined by the concaves of the ribs and extend perpendicularly to the top plate and the bottom plate.

10. The modular system in accordance with claim 9, wherein both the top plate and the bottom plate have the beams fixed on an inner surface thereof and a large number of openings to ensure all air current.

11. The modular system in accordance with claim 9, wherein both the top plate and the bottom plate have a suspended piece that is obtained by bending the rear side of each plate inward to be in contact with the beam located on the rear side, and the suspended piece is brought into contact with a bottom of each single battery to position the battery in the longitudinal direction.

12. The modular system in accordance with claim 9, wherein both the top plate and the bottom plate have a projected end piece that is obtained by bending the front side of each plate inward, and the projected end pieces have apertures that receive fixtures therein to secure end portions of the adjoining batteries.

13. The modular system in accordance with claim 9, wherein both the left and right side plates have notches at positions corresponding to the beams and folded pieces on upper and lower positions thereof to be in contact with the top plate and the bottom plate, and the top plate and the bottom plate are joined with each other via supporting columns fitted in the notches.

14. A modular-type battery system assembly, in which a plurality of modular systems in accordance with claim 9 are laid one upon another in a vertical direction, where at least the top plate, the bottom plate, the beams, the side plates, and the supporting columns are made of a metal, and the top plate and the bottom plate of adjoining modular systems are joined together by nuts and bolts fitted in apertures formed on corners of the top plate and the bottom plate.

15. The modular system in accordance with claim 9, wherein the specific pair of opposite outer surfaces on which the first ribs are formed is a pair of outer walls that are parallel to the major surfaces of the electrode plates.

16. A modular system for accommodating batteries, said modular system comprising: a top plate and a bottom plate that respectively have a plurality of beams formed on outer surface thereof and spanned and fixed over a longitudinal axis thereof; left and right side plates that respectively join left ends and right ends of the top plate and the bottom plate; a supporting column arranged on a rear side of the top plate and the bottom plate; and a plurality of single batteries arranged side by side between the top plate and the bottom plate to locate covers of the batteries with terminals on a front side of the top plate and the bottom plate, wherein each of the single batteries has a plurality of ribs that are formed on a specific pair of opposite outer surfaces in such a manner as to extend in a longitudinal direction of the single battery, each rib extending substantially the entire length of the surfaces, and have concaves formed thereon at regular intervals, the plurality of ribs formed on a matching outer surface of an adjoining single battery, and the joint surfaces of the adjacent single batteries form connection grooves that are defined by the concaves of the ribs and extend perpendicularly to the top plate and the bottom plate.

17. The modular system in accordance with claim 16, wherein both the left and right side plates have folded pieces that form upper, lower, front, and rear faces thereof and the folded pieces are connected to each other.

18. The modular system in accordance with claim 16, wherein both the left and right side plates have folded pieces that form upper, lower, front, and rear faces thereof and reinforcement pieces that are obtained by bending and welding ends of the folded pieces inward.

19. A modular-type battery system assembly, in which a plurality of modular systems in accordance with claim 16 are laid one upon another in a vertical direction, where at least the top plate, the bottom plate, the beams, the side plates, and the supporting column are made of a metal, and the top plate and the bottom plate of adjoining modular systems are joined together by nuts and bolts fitted in apertures formed on corners of the top plate and the bottom plate.

20. The modular system in accordance with claim 16, wherein the specific pair of opposite outer surfaces on which the first ribs are formed is a pair of outer walls that are parallel to the major surfaces of the electrode plates.

* * * * *